United States Patent
Sun et al.

(10) Patent No.: US 12,500,639 B2
(45) Date of Patent: Dec. 16, 2025

(54) CSI-RS ENHANCEMENT FOR PORT SELECTION CODEBOOK WITH CHANNEL RECIPROCITY

(71) Applicant: Apple Inc., Cupertino, CA (US)

(72) Inventors: Haitong Sun, Cupertino, CA (US); Dawei Zhang, Saratoga, CA (US); Wei Zeng, Saratoga, CA (US); Yushu Zhang, Beijing (CN); Hong He, San Jose, CA (US); Chunxuan Ye, San Diego, CA (US); Huaning Niu, San Jose, CA (US); Weidong Yang, San Diego, CA (US); Oghenekome Oteri, San Diego, CA (US); Jie Cui, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/442,035

(22) PCT Filed: Feb. 10, 2021

(86) PCT No.: PCT/CN2021/076443
§ 371 (c)(1),
(2) Date: Sep. 22, 2021

(87) PCT Pub. No.: WO2022/151561
PCT Pub. Date: Jul. 21, 2022

(65) Prior Publication Data
US 2023/0361829 A1 Nov. 9, 2023

(30) Foreign Application Priority Data
Jan. 15, 2021 (WO) ................ PCT/CN2021/072053

(51) Int. Cl.
*H04B 7/06* (2006.01)
*H04W 76/20* (2018.01)

(52) U.S. Cl.
CPC .......... *H04B 7/0626* (2013.01); *H04W 76/20* (2018.02)

(58) Field of Classification Search
None
See application file for complete search history.

(56) References Cited

U.S. PATENT DOCUMENTS

2016/0105264 A1* 4/2016 Chen ..................... H04L 5/0053
370/329
2017/0311296 A1* 10/2017 Onggosanusi ....... H04B 7/0456
(Continued)

FOREIGN PATENT DOCUMENTS

| CN | 103428749 A | 12/2013 |
| CN | 107409017 A | 11/2017 |
| CN | 109565388 A | 4/2019 |

OTHER PUBLICATIONS

International Search Report and Written Opinion directed to related International Application No. PCT/CN2021/076443, mailed Oct. 13, 2021; 8 pages.
(Continued)

*Primary Examiner* — Adnan Baig
(74) *Attorney, Agent, or Firm* — Sterne, Kessler, Goldstein & Fox P.L.L.C.

(57) ABSTRACT

The present disclosure relates to apparatus, methods, computer-readable storage medium and computer program product for CSI-RS enhancement for Port Selection Codebook with Channel Reciprocity. A cellular base station, comprising: at least one antenna; at least one radio coupled to the at least one antenna; and a processor coupled to the at least one radio; wherein the cellular base station is configured to: provide a Radio Resource Control (RRC) message to a wireless device; and provide a Channel State Information-Reference Signal (CSI-RS) to the wireless device via one or more ports based on the RRC message, wherein, the RRC (Continued)

message at least indicates one or more of: information on a density of the CSI-RS, information on time domain locations of the CSI-RS, information on a subset of ports for the wireless device to measure the CSI-RS, and information on a subset of Code Division Multiplexing (CDM) groups for the wireless device to measure the CSI-RS.

17 Claims, 11 Drawing Sheets

(56) References Cited

U.S. PATENT DOCUMENTS

| | | | |
|---|---|---|---|
| 2017/0353222 A1 | 12/2017 | Wei et al. | |
| 2018/0234153 A1* | 8/2018 | Lincoln | H04J 11/0079 |
| 2019/0215897 A1* | 7/2019 | Babaei | H04W 76/28 |
| 2019/0245603 A1* | 8/2019 | Yum | H04W 72/23 |
| 2020/0322013 A1* | 10/2020 | Gao | H04B 17/336 |
| 2020/0336259 A1* | 10/2020 | Kakishima | H04L 5/0023 |
| 2020/0358503 A1* | 11/2020 | Hao | H04W 72/23 |
| 2020/0382190 A1 | 12/2020 | Pawar et al. | |
| 2020/0389219 A1 | 12/2020 | Muruganathan et al. | |
| 2021/0266128 A1* | 8/2021 | Zhang | H04B 7/0617 |
| 2022/0271814 A1* | 8/2022 | Hao | H04B 7/0456 |
| 2023/0155758 A1* | 5/2023 | Park | H04L 27/261 |
| | | | 370/329 |
| 2023/0163911 A1* | 5/2023 | Hao | H04L 5/0057 |
| | | | 370/329 |
| 2023/0361832 A1* | 11/2023 | Hao | H04B 7/0626 |
| 2024/0048325 A1* | 2/2024 | Hao | H04L 5/005 |

OTHER PUBLICATIONS

3GPP, 3rd Generation Partnership Project; Technical Specification Group Radio Access Network; NR; Physical channels and modulation (Release 16), 3GPP TS 38.211 V16.4.0 (Dec. 2020), Valbonne—France.

Extended European Search Report directed to European Patent Application No. 21918760.6, mailed Oct. 24, 2024; 8 pages.

* cited by examiner

```
CSI-RS-ResourceMapping ::=          SEQUENCE {
    frequencyDomainAllocation       CHOICE {
        row1                            BIT STRING (SIZE (4)),
        row2                            BIT STRING (SIZE (12)),
        row4                            BIT STRING (SIZE (3)),
        other                           BIT STRING (SIZE (6))
    },
    nrofPorts                       ENUMERATED {p1,p2,p4,p8,p12,p16,p24,p32},
    firstOFDMSymbolInTimeDomain     INTEGER (0..13),
    firstOFDMSymbolInTimeDomain2    INTEGER (2..12)
    firstOFDMSymbolInTimeDomain3    INTEGER (6..12)
    firstOFDMSymbolInTimeDomain4    INTEGER (6..12)
    cdm-Type                        ENUMERATED {noCDM, fd-CDM2, cdm4-FD2-TD2, cdm8-FD2-TD4},
    density                         CHOICE {
        dot5                            ENUMERATED {evenPRBs, oddPRBs},
        one                             NULL,
        three                           NULL,
        spare                           NULL
    },
    freqBand                        CSI-FrequencyOccupation,
    ...
}
```

```
CSI-RS-ResourceMapping ::=        SEQUENCE {
    frequencyDomainAllocation         CHOICE {
        row1                              BIT STRING (SIZE (4)),
        row2                              BIT STRING (SIZE (12)),
        row4                              BIT STRING (SIZE (3)),
        other                             BIT STRING (SIZE (6))
    },
    nrofPorts                         ENUMERATED {p1,p2,p4,p8,p12,p16,p24,p32},
                                      BIT STRING (SIZE (16)),
    firstOFDMSymbolInTimeDomain       INTEGER (0..13),
    firstOFDMSymbolInTimeDomain2      INTEGER (2..12)
    cdm-Type                          ENUMERATED {noCDM, fd-CDM2, cdm4-FD2-TD2, cdm8-FD2-TD4},
    density                           CHOICE {
        dot5                              ENUMERATED {evenPRBs, oddPRBs},
        one                               NULL,
        three                             NULL,
        spare                             NULL
    },
    freqBand                          CSI-FrequencyOccupation,
    ...
}
```

*FIG. 15*

```
CSI-RS-ResourceMapping ::=        SEQUENCE {
    frequencyDomainAllocation         CHOICE {
        row1                              BIT STRING (SIZE (4)),
        row2                              BIT STRING (SIZE (12)),
        row4                              BIT STRING (SIZE (3)),
        other                             BIT STRING (SIZE (6))
    },
    nrofPorts                         ENUMERATED {p1,p2,p4,p8,p12,p16,p24,p32},
                                      BIT STRING (SIZE (16)),
    firstOFDMSymbolInTimeDomain       INTEGER (0..13),
    firstOFDMSymbolInTimeDomain2      INTEGER (2..12)
    cdm-Type                          ENUMERATED {noCDM, fd-CDM2, cdm4-FD2-TD2, cdm8-FD2-TD4},
    density                           CHOICE {
        dot5                              ENUMERATED {evenPRBs, oddPRBs},
        one                               NULL,
        three                             NULL,
        spare                             NULL
    },
    freqBand                          CSI-FrequencyOccupation,
    ...
}
```

*FIG. 16*

CSI-RS ENHANCEMENT FOR PORT SELECTION CODEBOOK WITH CHANNEL RECIPROCITY

CROSS-REFERENCE TO RELATED APPLICATION

This application is a U.S. National Phase of International Application No. PCT/CN2021/076443, filed Feb. 10, 2021, and claims priority to PCT/CN2021/072053, filed Jan. 15, 2021, both of which are hereby incorporated by reference in their entireties.

FIELD

The present disclosure relates to wireless devices, and more particularly to apparatus, systems, and methods for CSI-RS enhancement for Port Selection Codebook with Channel Reciprocity.

DESCRIPTION OF THE RELATED ART

The allocation for resource elements (RE) for reference signals is an important topic in wireless communication systems including fifth generation (5G) new radio (NR) communication systems. Especially, on one hand, there is a need to reduce the overhead of resources consumed by the reference signals, on the other hand, there is a need to bring more flexibility on the allocation of the resources. Accordingly, improvements in the resource allocation are desired.

CSI-RS (Channel Status Information Reference Signal) is a downlink (DL) reference signal for a UE (User Equipment) to measure channel(s). Based on the report regarding the channel measurement result from UE, the base station can adjust PHY/MAC parameters like MCS, Antenna Configuration, Codebook etc. In the case where reciprocity is assumed, the base station precodes the DL CSI-RS on each possible channel (e.g. port) for a UE, wherein the Codebook used for precoding the CSI-RS is related to the channel (e.g. port) that carries the CSI-RS.

In view of the above, particularly, improvements in the resource allocation of CSI-RS are desired. In other words, a CSI-RS enhancement for Port Selection Codebook with Channel Reciprocity is required.

SUMMARY

Embodiments relate to device, method, apparatus, computer-readable storage medium and computer program product for wireless communication.

According to one aspect, there is provided a cellular base station, comprising: at least one antenna; at least one radio coupled to the at least one antenna; and a processor coupled to the at least one radio; wherein the cellular base station is configured to: provide a Radio Resource Control (RRC) message to a wireless device; and provide a Channel State Information-Reference Signal (CSI-RS) to the wireless device via one or more ports based on the RRC message, wherein, the RRC message at least indicates one or more of: information on a density of the CSI-RS, information on time domain locations of the CSI-RS, information on a subset of ports for the wireless device to measure the CSI-RS, and information on a subset of Code Division Multiplexing (CDM) groups for the wireless device to measure the CSI-RS.

According to another aspect, there is provided a cellular base station, comprising: at least one antenna; at least one radio coupled to the at least one antenna; and a processor coupled to the at least one radio; wherein the cellular base station is configured to: provide a first Radio Resource Control (RRC) message to a wireless device, provide a second RRC message to the wireless device, and provide a Channel State Information-Reference Signal (CSI-RS) to the wireless device via one or more ports based on the first RRC message, wherein the second RRC message indicates at least two subbands on which the wireless device should measure the CSI-RS either on at least two sets of ports respectively, or on at least two sets of CDM groups respectively.

According to another aspect, there is provided a wireless device, comprising: at least one antenna; at least one radio coupled to the at least one antenna; and a processor coupled to the at least one radio; wherein the wireless device is configured to: receive a Radio Resource Control (RRC) message from a cellular base station; and receive a Channel State Information-Reference Signal (CSI-RS) from the cellular base station via one or more ports based on the RRC message, wherein, the RRC message at least indicates one or more of: information on a density of the CSI-RS, information on time domain locations of the CSI-RS, information on a subset of ports for the wireless device to measure the CSI-RS, and information on a subset of Code Division Multiplexing (CDM) groups for the wireless device to measure the CSI-RS.

According to another aspect, there is provided a wireless device, comprising: at least one antenna; at least one radio coupled to the at least one antenna; and a processor coupled to the at least one radio; wherein the cellular base station is configured to: receive a first Radio Resource Control (RRC) message from a cellular base station, receive a second RRC message from the cellular base station, and receive a Channel State Information-Reference Signal (CSI-RS) from the cellular base station via one or more ports based on the first RRC message, wherein the second RRC message indicates at least two subbands on which the wireless device should measure the CSI-RS either on at least two sets of ports respectively, or on at least two sets of CDM groups respectively.

According to another aspect, there is provided a method for a cellular base station, comprising: providing a Radio Resource Control (RRC) message to a wireless device; and providing a Channel State Information-Reference Signal (CSI-RS) to the wireless device via one or more ports based on the RRC message, wherein, the RRC message at least indicates one or more of: information on a density of the CSI-RS, information on time domain locations of the CSI-RS, information on a subset of ports for the wireless device to measure the CSI-RS, and information on a subset of Code Division Multiplexing (CDM) groups for the wireless device to measure the CSI-RS.

According to another aspect, there is provided a method for a cellular base station, comprising: providing a first Radio Resource Control (RRC) message to a wireless device, providing a second RRC message to the wireless device, and providing a Channel State Information-Reference Signal (CSI-RS) to the wireless device via one or more ports based on the first RRC message, wherein the second RRC message indicates at least two subbands on which the wireless device should measure the CSI-RS either on at least two sets of ports respectively, or on at least two sets of CDM groups respectively.

According to another aspect, there is provided a method for a wireless device, comprising: receiving a Radio Resource Control (RRC) message from a cellular base station; and receiving a Channel State Information-Reference Signal (CSI-RS) from the cellular base station via one or more ports based on the RRC message, wherein, the RRC message at least indicates one or more of: information on a density of the CSI-RS, information on time domain locations of the CSI-RS, information on a subset of ports for the wireless device to measure the CSI-RS, and information on a subset of Code Division Multiplexing (CDM) groups for the wireless device to measure the CSI-RS.

According to another aspect, there is provided a method for a wireless device, comprising: receiving a first Radio Resource Control (RRC) message from a cellular base station, receiving a second RRC message from the cellular base station, and receiving a Channel State Information-Reference Signal (CSI-RS) from the cellular base station via one or more ports based on the first RRC message, wherein the second RRC message indicates at least two subbands on which the wireless device should measure the CSI-RS either on at least two sets of ports respectively, or on at least two sets of CDM groups respectively.

According to another aspect, there is provided an apparatus, comprising: a processor configured to cause a wireless device to: receive a Radio Resource Control (RRC) message from a cellular base station; and receive a Channel State Information-Reference Signal (CSI-RS) from the cellular base station via one or more ports based on the RRC message, wherein, the RRC message at least indicates one or more of: information on a density of the CSI-RS, information on time domain locations of the CSI-RS, information on a subset of ports for the wireless device to measure the CSI-RS, and information on a subset of Code Division Multiplexing (CDM) groups for the wireless device to measure the CSI-RS.

According to another aspect, there is provided an apparatus, comprising: a processor configured to cause a wireless device to: receive a first Radio Resource Control (RRC) message from a cellular base station, receive a second RRC message from the cellular base station, and receive a Channel State Information-Reference Signal (CSI-RS) from the cellular base station via one or more ports based on the first RRC message, wherein the second RRC message indicates at least two subbands on which the wireless device should measure the CSI-RS either on at least two sets of ports respectively, or on at least two sets of CDM groups respectively.

According to another aspect, there is provided a computer-readable storage medium storing program instructions, wherein the program instructions, when executed by a computer system, cause the computer system to perform the method of any of the above aspects.

According to another aspect, there is provided a computer program product, comprising program instructions which, when executed by a computer, cause the computer to perform the method of any of the above aspects.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 12A illustrates the frequency domain OCC pattern 4;

FIG. 12B illustrates the frequency domain OCC pattern 8;

FIG. 13 illustrates another configuration example for the RRC message according to the present disclosure;

FIG. 14 illustrates the time domain OCC pattern 8;

FIG. 15 illustrates another configuration example for the RRC message according to the present disclosure;

FIG. 16 illustrates another configuration example for the RRC message according to the present disclosure.

Figure 1:
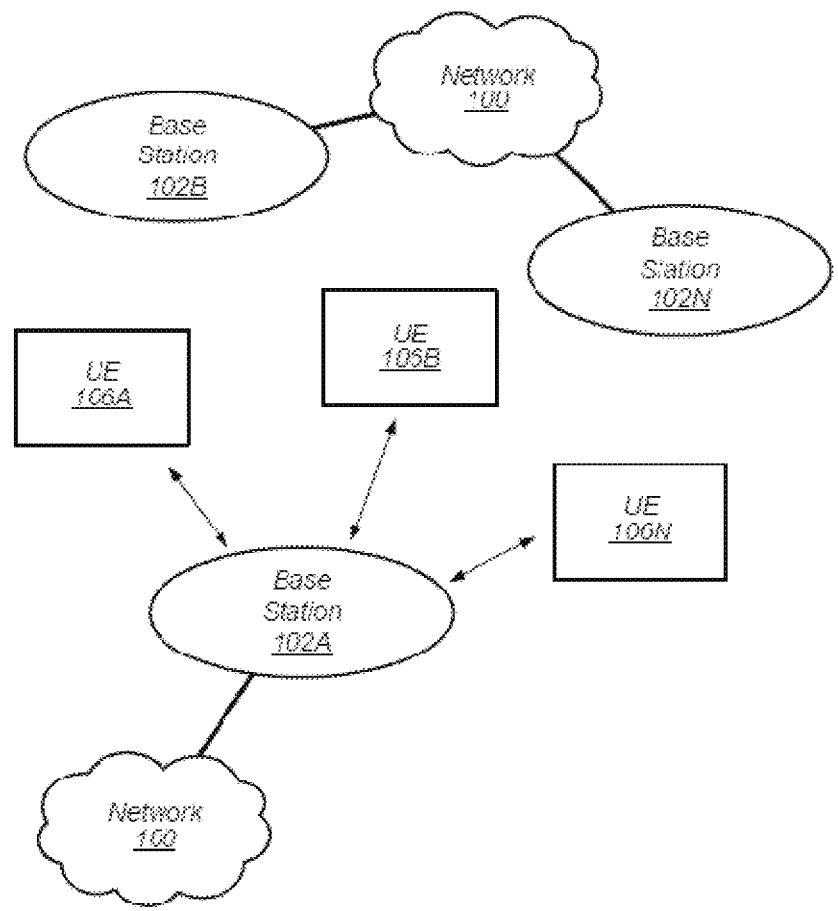
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™ iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
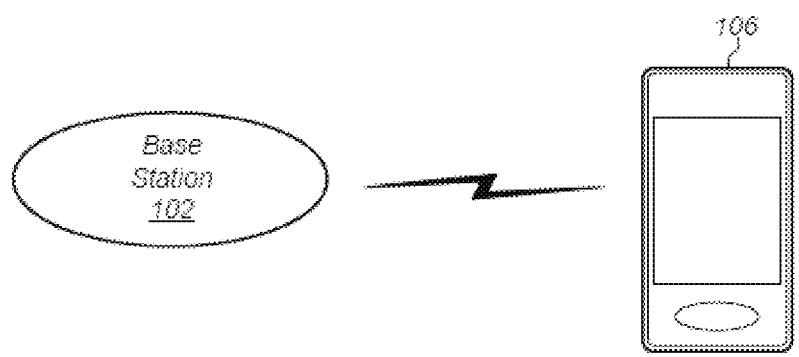
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network In addition, a gNB cell may include one or more transmission and reception points (TRPs). In addition, a UE capable of operating according to 5G NR may be connected to one or more TRPs within one or more gNBs. For example, it may be possible that the base station 102A and one or more other base stations 102 support joint transmission, such that UE 106 may be able to receive transmissions from multiple base stations (and/or multiple TRPs provided by the same base station).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
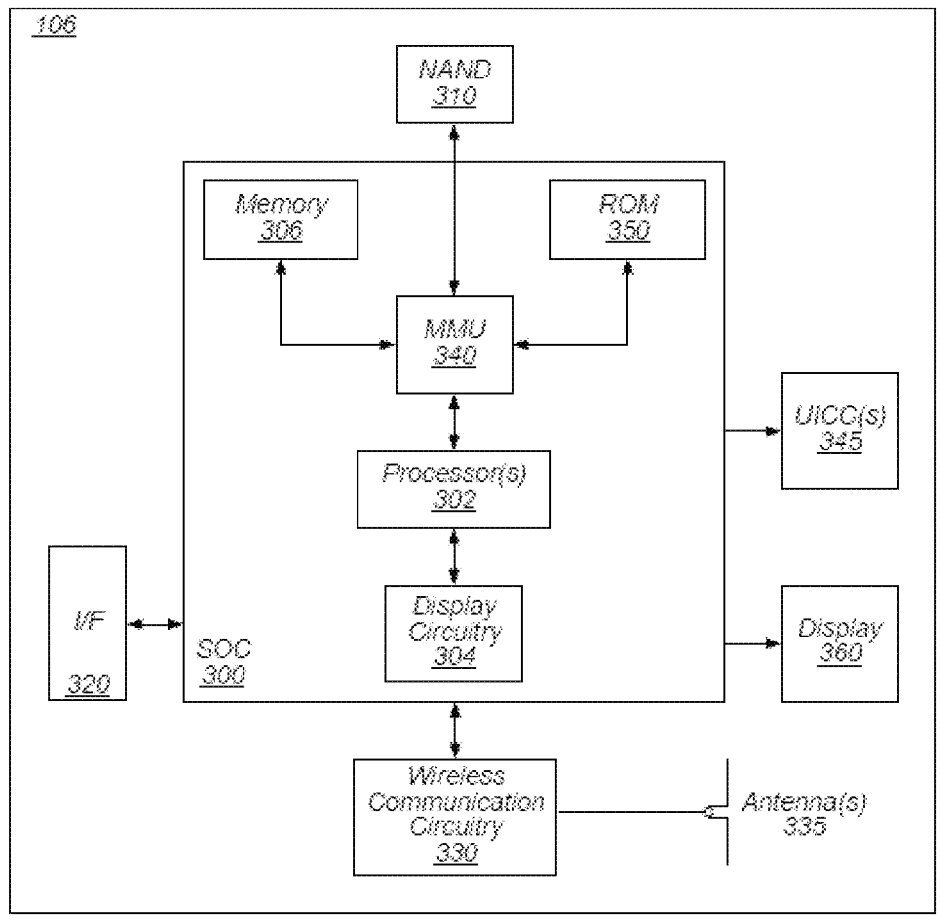
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash memory 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device I 06, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
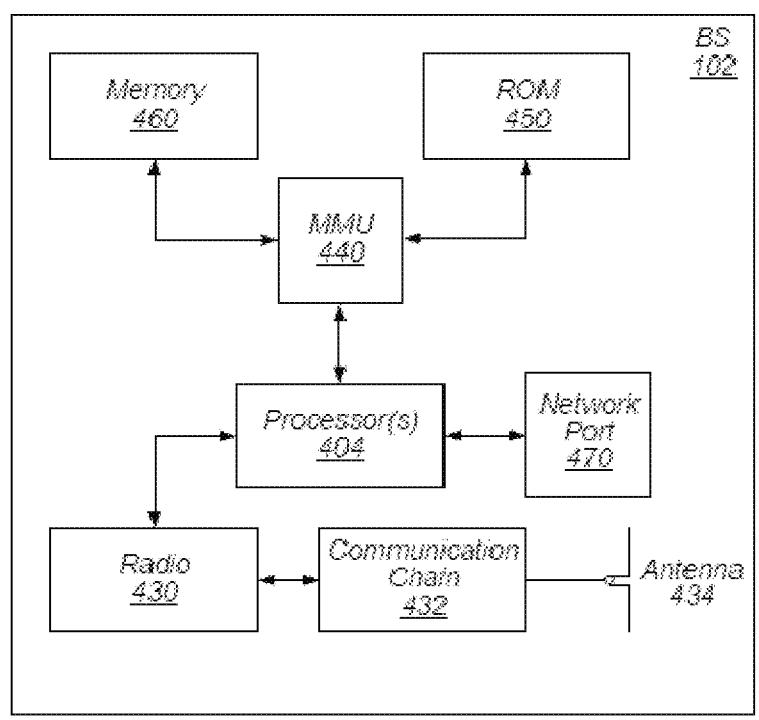
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transmission and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
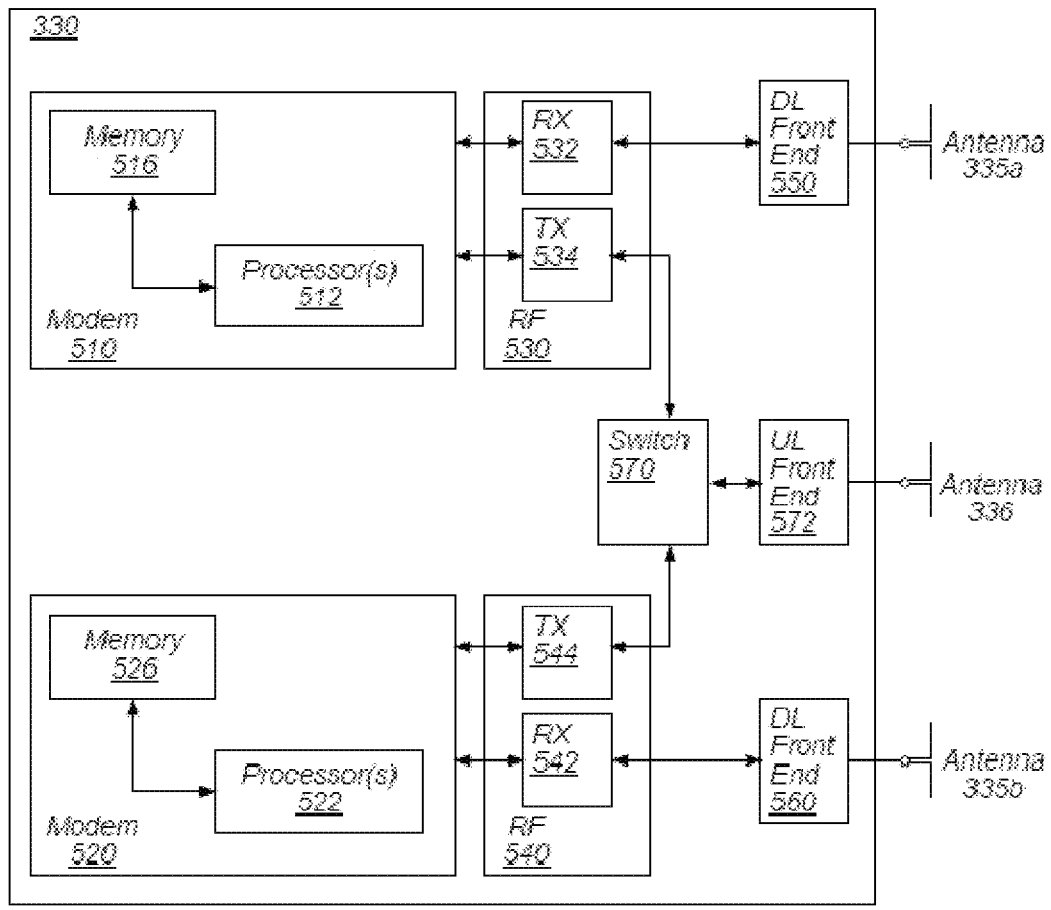
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some embodiments, the cellular communication circuitry 330 may also not include the switch 570, and the RF front end 530 or the RF front end 540 may be in communication, e.g., directly, with the UL front end 572.

Figures 6, 7:
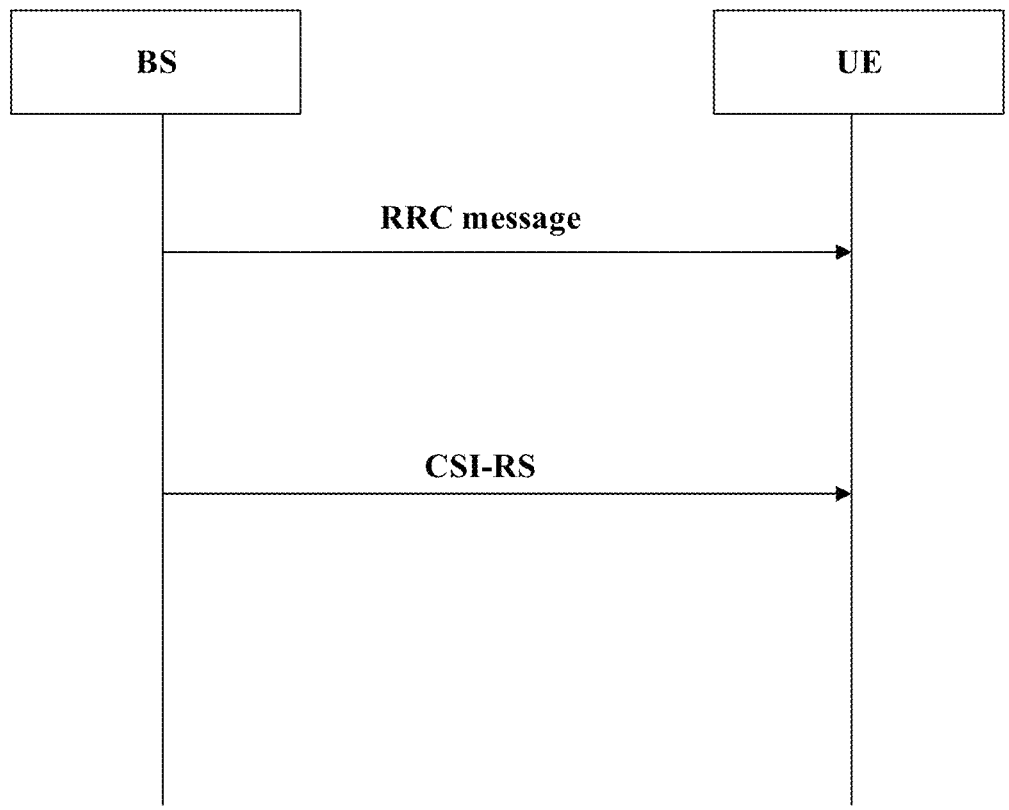
FIG. 6 illustrates a general flow-chat according to the present disclosure.
FIG. 7 illustrates a configuration example for a conventional RRC message.

FIG. 6—CSI-RS Enhancement for Port Selection Codebook with Channel Reciprocity The following description will take 5G NR as an example to illustrate the concept of the present disclosure, but it should be understood that the solution of the present disclosure is applicable to any appropriate mobile communication technology (e.g. 6G or any applicable advanced mobile communication technology).

In the following description, gNB is sometimes used to represent the control device at the base station side in a wireless communication network. It should be understood this is for illustrative purpose only but not restrictive. A base station based on any appropriate mobile communication technology is applicable.

In 5G NR, channel estimations can be made based on the assumptions of channel reciprocity. It can be assumed that downlink (DL) and uplink (UL) channels have certain reciprocity, i.e. similarity. In other words, if the state of a channel in one direction (e.g. either uplink or downlink) is estimated, it can be assumed that the state of a channel in the other direction (e.g. either downlink or uplink) is the same with the state of the channel in the estimated direction. For example, the base station (e.g. gNB in 5G) can estimate the uplink channel based on UL SRS (Sounding Reference Signal) from a UE. Based on the UL channel estimation and assumptions of channel reciprocity (i.e. assuming the UL channel and the DL channel are similar), the base station (e.g. gNB in 5G) can estimate the DL channel, that is, the base station can assume that the state of the DL channel is similar with the state of the UL channel estimated via the UL SRS.

In 5G NR, CSI (Channel Status Information) is a mechanism that a UE measures various radio channel quality and report the result to Network (base station, i.e. gNB). Based on the report from UE, the base station can adjust PHY/MAC parameters like MCS, Antenna Configuration, Codebook etc.

In the case where reciprocity is not assumed, DL reference signal (e.g. CSI in 4G) for UE to measure channel can be shared among a plurality of UEs. In comparison, in the case where reciprocity is assumed, the base station precodes the DL CSI-RS on each possible channel for a UE based on the DL channel estimation performed by the base station, wherein the Codebook used for precoding the CSI-RS is related to the channel that carries the CSI-RS. The meaning of Codebook under the context of CSI-RS is a set of Precoders (a set of Precoding Matrix). Since channels used by UEs to communication with the base station are different from UE to UE, the precoded CSI-RS cannot be shared by a plurality of UEs as in the non-reciprocity case.

Therefore, in the reciprocity case, CSI-RS needs to be transmitted and precoded per UE, which consumes a relatively large amount of physical resources. In turn, the overhead of CSI-RS is higher compared to non-reciprocity based CSI acquisition.

Therefore, there is a need to make a same set of resources for CSI-RS to support as many UEs as possible. In other words, there is a need to multiplexing CSI-RS from as many UEs as possible to reduce the overhead of CSI-RS.

As described above, based on the gNB DL channel estimate, the gNB precodes the DL CSI-RS on each possible channel for a UE. Herein, the channel can be represented by another term "port". According to the knowledge of the telecommunication field, the "port" refers to a certain set of resources in the sense of a combination of time, frequency and orthogonal code. A reference signal can be transmitted on one or more ports, i.e. via one or more channels. For example, transmitting the CSI-RS on a certain port means the CSI-RS is transmitted using some certain symbol(s) (e.g. OFDM (Orthogonal Frequency Division Multiplexing) symbol) in time domain, some certain subcarrier(s) in frequency domain and coded using a certain orthogonal code. While, transmitting the CSI-RS on another port means one or multiple of the following is changed: symbol(s) in time domain carrying the CSI-RS, subcarrier(s) in frequency domain carrying the CSI-RS and the orthogonal code used for the CSI-RS.

In fact, in the reciprocity case, CSI-RS may be precoded per UE. The base station can indicate UE to measure the precoded CSI-RS and report the preferred port selection (and in turn, the base station can determine which precoder is going to be used for DL data transmission).

According to the current standard, e.g. 3GPP TS 38.211 V16.4.0, up to 4 symbols CSI-RS can be configured to support up to 32 ports. Although the current standard has specified some resource mapping/allocation approaches for CSI-RS, the flexibility is not enough. Therefore, there is a need to provide some optional resource mapping/allocation approaches for CSI-RS to improve the flexibility.

The present disclosure will describe the following aspects to reduce the CSI-RS overhead for port-selection codebook and/or to improve the flexibility in resource mapping/allocation:

CSI-RS frequency domain enhancement
CSI-RS time domain enhancement
CSI-RS port domain enhancement
CSI-RS port to subband mapping Note that although the following will describe the features of the present technique from the above four aspects separately, the features from any of these four aspects can be applied in any combination.

FIG. 6 is a general flow-chat according to the present disclosure.

As illustrated in FIG. 6, the base station (herein after BS) can provide a Radio Resource Control (RRC) message to a wireless device (herein after UE) and provide a CSI-RS to the wireless device via one or more ports based on the RRC message, wherein, the RRC message at least indicates one or more of: information on a density of the CSI-RS, information on time domain locations of the CSI-RS, information on a subset of ports for the wireless device to measure the CSI-RS, and information on a subset of Code Division Multiplexing (CDM) groups for the wireless device to measure the CSI-RS. According to the present disclosure, the RRC message is generated by the base station, i.e. the information indicated by the RRC message is set by the base station. According to the present disclosure, the CSI-RS is generated and transmitted by the base station based on the RRC message FIGS. 7-16 and Additional Information FIGS. 7-16 illustrate further aspects that might be used in conjunction with the method of FIG. 6 if desired. It should be noted, however, that the exemplary details illustrated in and described with respect to FIGS. 7-16 are not intended to be limiting to the disclosure as a whole: numerous variations and alternatives to the details provided herein below are possible and should be considered within the scope of the disclosure.

According to the present disclosure, the RRC message sent to a UE can be a signaling indicating the resource mapping/allocation for CSI-RS. For example, the RRC message can be the CSI-RS-ResourceMapping described in 3GPP TS 38.211 V16.4.0.

FIG. 7 illustrates an example of the conventional RRC message.

In order to provide the CSI-RS to a UE via one or more ports, a BS need to notify the UE the location of the CSI-RS corresponding to each port in the physical resource grid. Table 1 (which is also represented in 3GPP TS 38.211 V16.4.0-Table 7.4.1.5.3-1) shows possible CSI-RS locations within a slot. The UE can determine the location of the CSI-RS corresponding to each port using a combination of the received RRC message (e.g. the CSI-RS-ResourceMapping shown in FIG. 7) and the CSI-RS locations table (e.g. Table 1).

starting position(s) in frequency and time domain of the CSI-RS. Using the information given in this column, together with the columns "k'" and "l'" and the integer value set for the parameter "firstOFDMSymbolInTimeDomain" and/or the integer value set for the parameter "firstOFDM-

TABLE 1

| Row | Ports X | Density ρ | cdm-Type | $(\bar{k}, \bar{l})$ | CDM group index j | k' | l' |
|---|---|---|---|---|---|---|---|
| 1 | 1 | 3 | noCDM | $(k_0, l_0), (k_0 + 4, l_0), (k_0 + 8, l_0)$ | 0, 0, 0 | 0 | 0 |
| 2 | 1 | 1, 0.5 | noCDM | $(k_0, l_0)$ | 0 | 0 | 0 |
| 3 | 2 | 1, 0.5 | fd-CDM2 | $(k_0, l_0)$, | 0 | 0, 1 | 0 |
| 4 | 4 | 1 | fd-CDM2 | $(k_0, l_0), (k_0 + 2, l_0)$ | 0, 1 | 0, 1 | 0 |
| 5 | 4 | 1 | fd-CDM2 | $(k_0, l_0), (k_0, l_0 + 1)$ | 0, 1 | 0, 1 | |
| 6 | 8 | 1 | fd-CDM2 | $(k_0, l_0), (k_1, l_0), (k_2, l_0), (k_3, l_0)$, | 0, 1, 2, 3 | 0, 1 | 0 |
| 7 | 8 | 1 | fd-CDM2 | $(k_0, l_0), (k_1, l_0), (k_0, l_0 + 1), (k_1, l_0 + 1)$ | 0, 1, 2, 3 | 0, 1 | 0 |
| 8 | 8 | 1 | cdm4-FD2-TD2 | $(k_0, l_0), (k_1, l_0)$ | 0, 1 | 0, 1 | 0, 1 |
| 9 | 12 | 1 | fd-CDM2 | $(k_0, l_0), (k_1, l_0), (k_2, l_0), (k_3, l_0)$, $(k_4, l_0), (k_5, l_0)$ | 0, 1, 2, 3, 4, 5 | 0, 1 | 0 |
| 10 | 12 | 1 | cdm4-FD2-TD2 | $(k_0, l_0), (k_1, l_0), (k_2, l_0)$ | 0, 1, 2 | 0, 1 | 0, 1 |
| 11 | 16 | 1, 0.5 | fd-CDM2 | $(k_0, l_0), (k_1, l_0), (k_2, l_0), (k_3, l_0)$, $(k_0, l_0 + 1), 7(k_1, l_0 + 1)$, $(k_2, l_0 + 1), (k_3, l_0 + 1)$ | 0, 1, 2, 3, 4, 5, 6, 7 | 0, 1 | 0 |
| 12 | 16 | 1, 0.5 | cdm4-FD2-TD2 | $(k_0, l_0), (k_1, l_0), (k_2, l_0), (k_3, l_0)$ | 0, 1, 2, 3 | 0, 1 | 0, 1 |
| 13 | 24 | 1, 0.5 | fd-CDM2 | $(k_0, l_0), (k_1, l_0), (k_2, l_0), (k_0, l_0 + 1)$ $(k_1, l_0 + 1), (k_2, l_0 + 1), (k_0, l_1)$, $(k_1, l_1), (k_2, l_1), (k_0, l_1 + 1)$, $(k_1, l_1 + 1), (k_2, l_1 + 1)$ | 0, 1, 2, 3, 4, 5, 6, 7, 8, 9, 10, 11 | 0, 1 | 0 |
| 14 | 24 | 1, 0.5 | cdm4-FD2-TD2 | $(k_0, l_0), (k_1, l_0), (k_2, l_0), (k_0, l_1), (k_1, l_1)$, $(k_2, l_1)$ | 0, 1, 2, 3, 4, 5 | 0, 1 | 0, 1 |
| 15 | 24 | 1, 0.5 | cdm8-FD2-TD4 | $(k_0, l_0), (k_1, l_0), (k_2, l_0)$ | 0, 1, 2 | 0, 1 | 0, 1 2, 3 |
| 16 | 32 | 1, 0.5 | fd-CDM2 | $(k_0, l_0), (k_1, l_0), (k_2, l_0), (k_3, l_0)$, $(k_0, l_0 + 1), (k_1, l_0 + 1)$, $(k_2, l_0 + 1), (K_3, l_0 + 1), (k_0, l_1)$, $(k_2, l_1), (k_2, l_1), (k_3, l_1), (k_0, l_1 + 1)$, $(k_1, l_1 + 1), (k_2, l_1 + 1), (k_3, l_1 + 1)$ | 0, 1, 2, 3, 4, 5, 6, 7, 8, 9, 10, 11, 12, 13, 14, 15 | 0, 1 | 0 |
| 17 | 32 | 1, 0.5 | cdm4-FD2-TD2 | $(k_0, l_0), (k_1, l_0), (k_2, l_0), (k_3, l_0), (k_0, l_1)$, $(k_1, l_1), (k_2, l_1), (k_3, l_1)$ | 0, 1, 2, 3, 4, 5, 6, 7 | 0, 1 | 0. 1 |
| 18 | 32 | 1. 0.5 | cdm8-FD2-TD4 | $(k_0, l_0), (k_1, l_0), (k_2, l_0), (k_3, l_0)$, | 0, 1, 2, 3 | 0, 1 | 0, 1, 2, 3 |

In Table 1, the column "Row" can be considered as an index. For example, in the RRC message. The BS can use the parameter "frequencyDomainAllocation" jointly with "nrofPorts", "firstOFDMSymbolInTimeDomain" and/or "firstOFDMSymbolInTimeDomain2" and "cdm-Type" to indicate the UE which row should be used to determine the resource position for the CSI-RS. For example, the BS can indicate row 1 using the parameter "frequencyDomainAllocation" to notify the UE to use row 1 in Table 1 to determine the resource position for the CSI-RS. The column "Ports" in Table 1 describes the number of ports supported under the Resource mapping/allocation configuration of a corresponding row. The column "Density" in Table 1 describes how many times the CSI-RS will be repeated in one Psychical Resource Block (PRB). For example, in the RRC message, the BS can use the parameter "density" to indicate the UE the density of CSI-RS. For example, the BS can choose "three" for the parameter "density" to notify the UE that the density of CSI-RS is 3. The density will be described in detail below. The column "cdm-Type" describes the pattern of REs occupied by the CSI-RS. For example, in the RRC message, the BS can choose any one from "noCDM", "fd-CDM2", "cdm4-FD2-TD2" and "cdm8-FD2-TD4" for the parameter "cdm-Type" to notify the UE which CDM type is used by the CSI-RS. The cdm-Type will be described in detail below. The column "$(\bar{k}, \bar{l})$" in Table 1 describes the SymbolInTimeDomain2" in the RRC message, UE can determine the position of the CSI-RS within the physical resource grid. The column "CDM group index j" in Table 1 describes the groups of orthogonal codes for CDM (Code Division Multiplexing) applied on the CSI-RS. The CDM group will be described in detail below.

To sum up, the UE can use the information contained in the RRC message transmitted by the BS along with the Table 1 to determine how the CSI-RS is mapped in the physical resource grid, such that the UE can measure the CSI-RS and report the result to the BS for port selection codebook.

CSI-RS Frequency Domain Enhancement

As can be understood from Table 1, the current standard merely supports 3, 1 and 0.5 as the value of the density. However, such relatively high density might impede multiplexing CSI-RS from a plurality of UEs.

Figure 8:
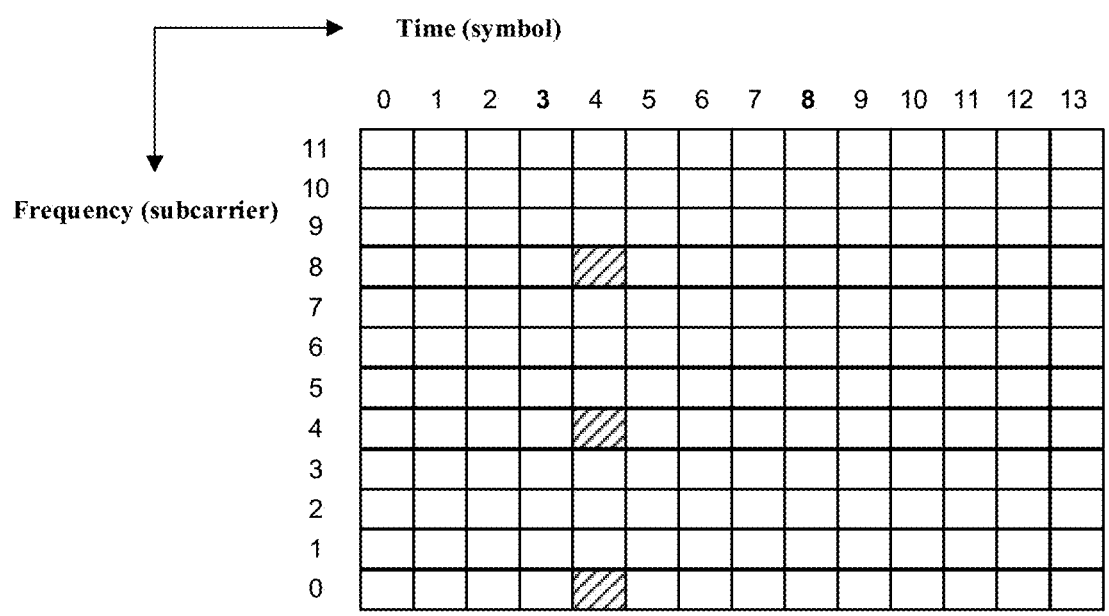
FIG. 8 illustrates an example showing how CSI-RS occupies the RE(s) in the resource grid of one PRB.

As explained above, Density describes how many times the CSI-RS will be repeated in one Psychical Resource Block (PRB). For example, if the density equals to 1, the CSI-RS for one UE will be transmitted per Psychical Resource Block (PRB). If the density equals to 0.5, the CSI-RS for one UE will be transmitted every two PRBs. If the density equals to 3, the CSI-RS for one UE will be transmitted three times in one PRB. FIG. 8 illustrates an example showing how the CSI-RS occupies the RE(s) of one PRB with a density of 3. As illustrated, the REs filled with diagonal lines are used for transmitting the CSI-RS to a specific UE (e.g. UE1). FIG. 8 can correspond to the resource occupation by CSI-RS for the case of row 1 in Table 1.

Figure 9A:
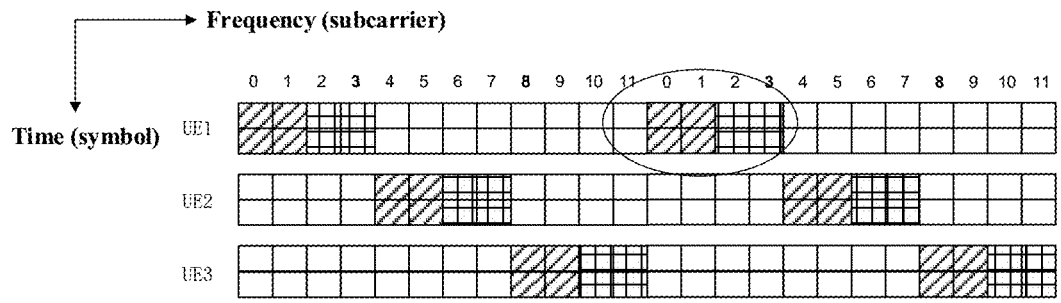
FIG. 9A illustrates an example of RE occupation by CSI-RS with the density being 1.

FIG. 9A illustrates an example where a density of 1 is applied. FIG. 9A can correspond to the resource occupation by CSI-RS for the case of row 8 in Table 1. As illustrated, the REs filled with diagonal lines and filled with grid are used for transmitting the CSI-RS to a specific UE (e.g. UE1) via 8 ports, wherein, the CSI-RS is transmitted via a first 4 ports using the REs filled with diagonal lines and the first 4 ports are supported by multiplexing the CSI-RS using 4 orthogonal codes; and the CSI-RS is transmitted via a second 4 ports using the REs filled with grid and the second 4 ports are supported by multiplexing the CSI-RS using 4 orthogonal codes. Since the density of CSI-RS is 1, the CSI-RS on 8 ports for UE1 is again transmitted in the next PRB using the same set of REs (shown with a circle).

It can be determined from FIG. 9A that in such a resource mapping/allocation with the density being 1, if all the UEs share the same configuration for resource mapping/allocation (i.e. the configuration corresponding to row 8 of Table 1), the CSI-RS for only three UEs can be multiplexed. Note that, although in FIG. 9A, the REs occupied by the CSI-RS for the three UEs are shown in three separate lines in time domain for the simplicity of illustration, it should be understood that the REs occupied by the CSI-RS for the three UEs actually occupy the same symbols in time domain rather than different symbols (i.e. occupy the symbols in the same line).

In order to allow multiplexing more UEs, lower density can be used.

For example, the base station can set the value of the density of the CSI-RS to a relatively low value such that the CSI-RS provided by the BS using a set of REs is enabled to be multiplexed for as many UEs as possible. Particularly, the value of the density of the CSI-RS can be lower than a value of the density of the CSI-RS specified in 3GPP TS 38.211 V16.4.0-Table 7.4.1.5.3-1.

For example, lower density, e.g. density=0.5, can be allowed for:
 4 port CSI-RS, Row 4/5 in Table 7.4.1.5.3-1 (i.e. Table 1 above) in 3GPP TS 38.211 V16.4.0,
 8 port CSI-RS, Row 6/7/8 in Table 7.4.1.5.3-1 (i.e. Table 1 above) in 3GPP TS 38.211 V16.4.0, and
 12 port CSI-RS, Row 9/10 in Table 7.4.1.5.3-1 (i.e. Table 1 above) in 3GPP TS 38.211 V16.4.0.

Figure 9B:
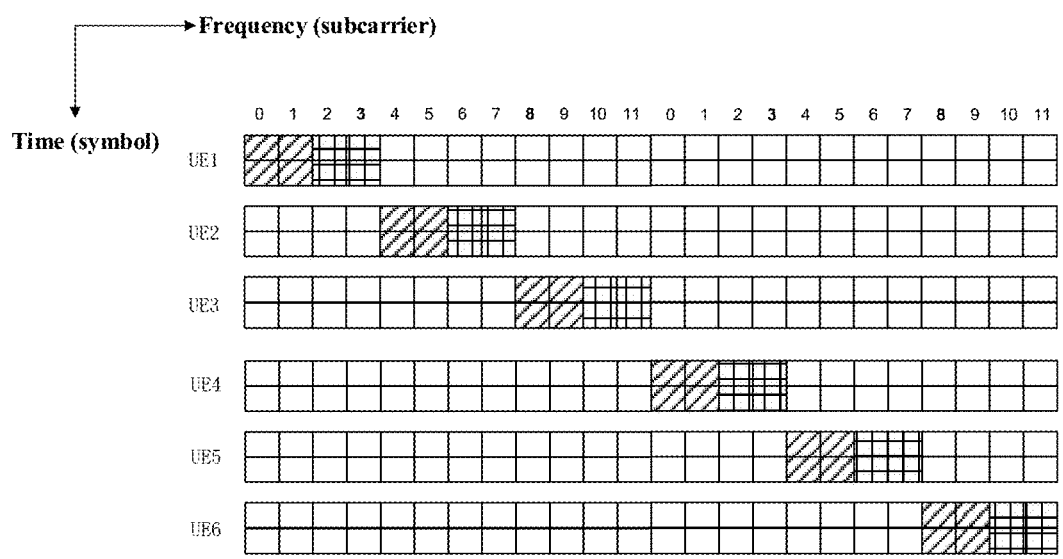
FIG. 9B illustrates an example of RE occupation by CSI-RS with the density being 0.5.

FIG. 9B illustrates an example where a density of 0.5 is applied. Except for the density, the rest configuration of FIG. 9B can correspond to the resource occupation by CSI-RS for the case of row 8 in Table 1. As shown in FIG. 9B, since the CSI-RS for one UE is transmitted every two PRBs, the same set of REs in the second PRB can be used for other UEs. Therefore, as shown in FIG. 9B, take 8 ports, Row 8 as example, the density 0.5 allows multiplexing CSI-RS from 6 UEs. Please note that although in the example, multiplexing is performed for UE sharing the same configuration for resource mapping/allocation, the multiplexing can be performed for UE having different configuration for resource mapping/allocation, i.e. corresponding to different rows in Table 1.

For another example, the density can be set to an even lower value. For example, Density lower than 0.5 can be configured for CSI-RS, e.g. density 0.25, 0.125, etc. For example, the density 0.25, 0.125, etc. can be applied for 1-port, 2-port, 4-port, 8-port, 12-port, 16-port and/or 32-port CSI-RS, and/or can be applied for the case where CSI-RS is transmitted via more than 32 ports.

More particularly, the value of the density of the CSI-RS can be set to 0.5 for the case where the CSI-RS is provided via 4 ports, 8 ports or 12 ports, and/or the value of the density of the CSI-RS can be set to 0.25 or 0.125 for the case where the CSI-RS is provided via any number of ports.

According to the present disclosure, the value of the density of the CSI-RS can be set by a base station based on the number of ports supported by a UE, wherein the value of the density of the CSI-RS is set to a relatively low value in the case where the number of ports supported by the wireless device is smaller than a predetermined threshold. For example, the BS can receive capability information from a UE, wherein the capability information indicates a number of ports supported by the UE. In responsive to the received capability information indicating a number of ports supported by the UE being smaller than a predetermined threshold, the base station can set the value of the density of the CSI-RS to a relatively low value.

For example, the density lower than 0.5 can be only allowed for a subset of CSI-RS targeting particular UEs with one or both of the conditions:
 only allowed for CSI-RS with number of ports greater than X, e.g. the density lower than 0.5 can be allowed for the CSI-RS targeting UEs supporting more than X ports; and
 only allowed for CSI-RS with the number of ports less than Y, e.g. the density lower than 0.5 can be allowed for the CSI-RS targeting UEs supporting less than Y ports.

The value of X and the value of Y can be determined by the base station according to actual needs. For example, the value of X can be 2 and the value of Y can be 4. Note that, other values for X and Y can be applicable.

As introduced above, the information on the density of the CSI-RS can be notified by the RRC message (e.g. the CSI-RS-ResourceMapping shown in FIG. 7), wherein, in the case where the value of the density is lower than one, the RRC message can further indicate PRBs which carry the CSI-RS for a certain UE.

Figures 10, 11:
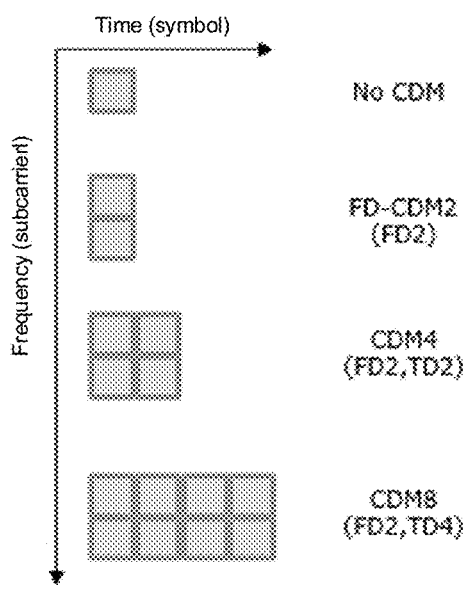
FIG. 10 illustrates a configuration example for the RRC message according to the present disclosure.
FIG. 11 illustrates the current four patterns for CSI-RS.

FIG. 10 illustrates an example of the RRC message according to the present disclosure. As can be seen from FIG. 10, in the actual RRC message sent to a specific UE, the density can be set to any one from dot125 (i.e. 0.125), dot25 (i.e. 0.25), dot5 (i.e. 0.5), one, or three. In the case where the density is 0.125, 0.25 or 0.5, the RRC message further contains the information indicating PRBs which carry the CSI-RS for the specific UE. For example, for UE1, for the case where density equals to 0.25, the PRBs carrying the CSI-RS can be every first PRB (or every second PRB or every third PRB or every fourth PRB) in each group of 4 PRBs. For another example, for UE1, for the case where density equals to 0.125, the PRBs carrying the CSI-RS can be every 1st PRB (or every 2nd PRB or every 3rd PRB or every 4th PRB or every 5th PRB or every 6th PRB or every 7th PRB or every 8th PRB) in each group of 8 PRBs The CSI-RS frequency domain enhancement with lower density has been described above. With such an enhancement, CSI-RS transmitted using a certain set of RE(s) can be multiplexed for supporting more UEs. In other words, comparing to the conventional solution, assuming using a same set of REs, the present solution enables to transmit CSI-RS for more UEs.

The following will describe another CSI-RS frequency domain enhancement for improving the resource mapping/allocation flexibility.

As described above, the current standard merely specifies four cdm types, i.e. "noCDM", "fd-CDM2", "cdm4-FD2-TD2" and "cdm8-FD2-TD4". The "cdm-Type" describes how CSI-RS occupies the REs in the resource grid. FIG. 11 illustrates the current four patterns. For example, for the case of row 4 with the cdm-Type being fd-CDM2 in table 1, to support 4 ports in total, CSI-RS should be multiplexed using two orthogonal codes in each RE set with the pattern fd-CDM2 (i.e. a symbol in time domain and two subcarriers in frequency domain). Such a case is described as frequency domain OCC (Orthogonal Cover Code) pattern 2. As can be seen from FIG. 11, currently, in frequency domain, only the pattern containing one or two subcarriers can be supported for CSI-RS. Therefore, currently, only frequency domain OCC patterns 1 and 2 are supported.

However, such a configuration is not flexible enough. For example, currently, there are only two resource mapping configurations for supporting 16 ports (see row 11 and row 12 in Table 1). These two configurations are respectively: (1) occupying 8 RE sets with the pattern (fd-CDM2), in each RE set, two orthogonal codes are used to multiplexing the CSI-RS; and (2) occupying 4 RE sets with the pattern (cdm4-FD2-TD2), in each RE set, four orthogonal codes are used to multiplexing the CSI-RS.

In order to improve the flexibility, frequency domain OCC pattern 4 and 8 can be supported for CSI-RS. For example, with such extra patterns being enabled, for supporting 16 ports, there could be at least the following further manners: (1) occupying 2 RE sets with a FD8 pattern (e.g. a symbol in time domain and eight subcarriers in frequency domain), in each RE set, eight orthogonal codes are used to multiplexing the CSI-RS (under this case, frequency domain OCC pattern 8 will be used); (2) occupying 2 RE sets with a FD4-TD4 pattern (e.g. four symbols in time domain and four subcarriers in frequency domain), in each RE set, eight orthogonal codes are used to multiplexing the CSI-RS (under this case, frequency domain OCC pattern 4 will be used).

Figures 12A, 12B:
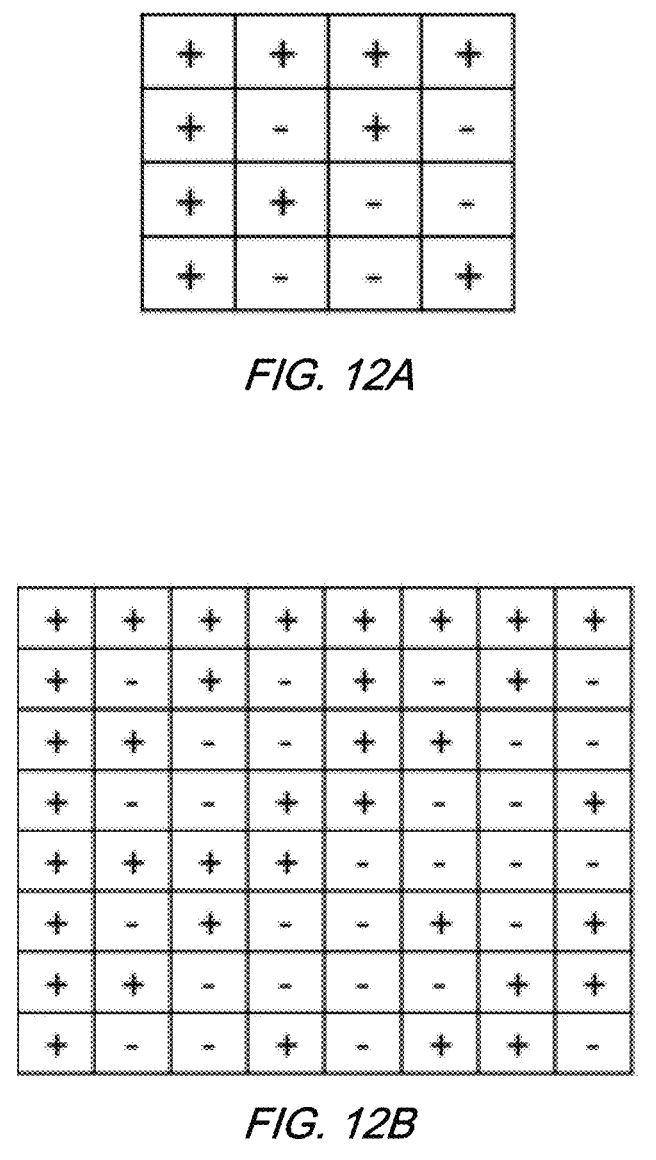

The frequency domain OCC pattern 4 and frequency domain OCC pattern 8 are shown in FIG. 12A and FIG. 12B, wherein "+" represents "+1" and "−" represents "−1". The frequency domain OCC pattern 4 contains (+1, +1, +1, +1), (+1, −1, +1, −1), (+1, +1, −1, −1) and (+1, −1, −1, +1) as four orthogonal codes. The frequency domain OCC pattern 8 contains (+1, +1, +1, +1, +1, +1, +1, +1), (+1, −1, +1, −1, +1, −1, +1, −1), (+1, +1, −1, −1, +1, +1, −1, −1), (+1, −1, −1, +1, +1, −1, −1, +1), (+1, +1, +1, +1, −1, −1, −1, −1), (+1, −1, +1, −1, −1, +1, −1, +1), (+1, +1, −1, −1, −1, −1, +1, +1) and (+1, −1, −1, +1, −1, +1, +1, −1) as eight orthogonal codes.

Involving more frequency domain OCC patterns actually implies that there will be more rows in Table 1. Accordingly, some detailed calculations for the locations in frequency domain for CSI-RS are required to be updated.

Particularly, when frequency domain OCC pattern 4 and 8 is supported for CSI-RS, for CSI-RS configuration in 3GPP TS 38.211, the α determination can be updated by incorporating the following formulas:

α=4ρ when OCC pattern 4 is used,

α=8ρ when OCC pattern 8 is used, wherein, ρ is the density of the CSI-RS, and α is a parameter used when mapping the CSI-RS to physical resources.

Please recall that the current α determination is involved in the following equations for mapping the CSI-RS to physical resources:

$$a_{k,l}^{(p,\mu)} = \beta_{CSIRS} w_f(k') \cdot w_t(l') \cdot r_{l,n_{s,f}}(m')$$

$$m' = \lfloor n\alpha \rfloor + k' + \left\lfloor \frac{k\rho}{N_{sc}^{RB}} \right\rfloor$$

$$k = nN_{sc}^{RB} + \bar{k} + k'$$

$$l = \bar{l} = l'$$

$$\alpha = \begin{cases} \rho & \text{for } X = 1 \\ 2\rho & \text{for } X > 1 \end{cases}$$

$$n = 0, 1, \ldots$$

The detailed definitions to the parameters concerned in the equations can be found in 3GPP TS 38.211 V16.4.0. Under the present disclosure, the above equations can be updated by involving the above update to the α determination.

Besides, the frequencyDomainAllocation configuration can be updated by incorporating the following formulas:

$[b_2, b_1, b_0], k_{i-1}=4f(i)$ when OCC pattern 4 is used, $[b_1, b_0], k_{i-1}=8f(i)$ when OCC pattern 8 is used, where these formulas are used for calculation of the value $k_i$ (i.e. $k_0$, $k_1$, $k_2$, and $k_3$) in Table 1, f(i) is the bit number of the $i^{th}$ bit in the bitmap specified in the frequencyDomainAllocation set to one, and $[b_2, b_1, b_0]$ and $[b_1, b_0]$ are the respective bitmap.

Please recall that the current frequencyDomainAllocation configuration is performed in the following way:

$[b_3 \ldots b_0], k_{i-1}=f(i)$ for row 1 of Table 7.4.1.5.3-1
(i.e. the above Table 1)

$[b_{11} \ldots b_0], k_{i-1}=f(i)$ for row 2 of Table 7.4.1.5.3-1
(i.e. the above Table 1)

$[b_2 \ldots b_0], k_{i-1}=f(i)$ for row 4 of Table 7.4.1.5.3-1
(i.e. the above Table 1)

$[b_5 \ldots b_0], k_{i-1}=2f(i)$ for all other cases

The detailed explanations to these equations can be found in 3GPP TS 38.211 V16.4.0.

CSI-RS Time Domain Enhancement

As described above, the UE can use the parameter "firstOFDMSymbolInTimeDomain" or together with the parameter "firstOFDMSymbolInTimeDomain2" in the RRC message along with the information Table 1 to determine the position of the CSI-RS within the physical resource grid. "firstOFDMSymbolInTimeDomain" and "firstOFDMSymbolInTimeDomain2" are parameters related to information on time domain locations. Particularly, these two parameters can indicate locations of a first symbol of the CSI-RS in time domain. In other words, the value of these parameters can help to determine at which symbols in the resource grid of one PRB the CSI-RS can start. At most two locations of a first symbol of the CSI-RS in time domain are allowed currently.

However, the current configuration with this regard fails to satisfy the industry demand. For example, as the development of the 5G NR, more ports (e.g. more than 32 ports) might be involved. The limited locations of a first symbol of the CSI-RS in time domain restrict the resource mapping of CSI-RS to support more than 32 ports. For another example, the limited locations of a first symbol of the CSI-RS in time domain also restrict the flexibility in RE allocation for CSI-RS.

In view of the above, the present disclosure proposes to involve more possible starting positions of CSI-RS in the RRC message.

FIG. 13 illustrates the enhanced RRC message. As can be seen from FIG. 13, the information on time domain locations can refer to more than two locations of a first symbol of the CSI-RS in time domain (e.g. four locations), i.e. "firstOFDMSymbolInTimeDomain", "firstOFDMSymbolInTimeDomain1", "firstOFDMSymbolInTimeDomain2" and "firstOFDMSymbolInTimeDomain3". The BS can set the locations flexibly. For example, the RRC message transmitted to a UE can contain one, two, three or four integer values (which corresponds to the above four parameters respectively) to indicate the locations of a first symbol of the CSI-RS in time domain.

To further enhance the flexibility, similar to the CSI-RS frequency domain enhancement, higher time domain OCC pattern can be supported for CSI-RS. As can be seen from FIG. 11, currently, in time domain, only the pattern containing one, two or four symbols can be supported for CSI-RS. Therefore, currently, only time domain OCC patterns 1, 2 and 4 are supported.

In order to improve the flexibility, time domain OCC pattern 8 can be supported for CSI-RS. The time domain OCC pattern 8 is shown in FIG. 14, wherein "+" represents "+1" and "−" represents "−1". The time domain OCC pattern 8 contains (+1, +1, +1, +1, +1, +1, +1, +1), (+1, −1, +1, −1, +1, −1, +1, −1), (+1, +1, −1, −1, +1, +1, −1, −1), (+1, −1, −1, +1, +1, −1, −1, +1), (+1, +1, +1, +1, −1, −1, −1, −1), (+1, −1, +1, −1, −1, +1, −1, +1), (+1, +1, −1, −1, −1, −1, +1, +1) and (+1, −1, −1, +1, −1, +1, +1, −1) as eight orthogonal codes.

CSI-RS Port Domain Enhancement

As described above, CSI-RS can be configured to support up to 32 ports or even more the 32 ports under the present disclosure. In actual cases, some UEs do not have the capability to support so many ports and may only support a few ports (e.g. 2 or 4 ports). However, if the BS has configured the CSI-RS for a relatively big number of ports (e.g. 32 ports) (in other words, BS transmits the CSI-RS via a relatively big number of ports) for a UE which only supports a few ports (e.g. 4 ports), the UE need to perform measurement for the CSI-RS transmitted via all of the 32 ports, for example. In this case, the REs configured for the rest 28 ports are wasted.

In view of such a disadvantage, as a first solution, the present disclosure proposes to configure a subset of the ports for the UE to measure CSI-RS. According to the present disclosure, the RRC message provided from a BS to a UE can contain information on a subset of ports for the UE to measure the CSI-RS. Such information can include a bit map for the subset of ports, wherein each bit with one indicates a corresponding port on which the UE should measure the CSI-RS.

FIG. 15 is an example of such an enhanced RRC message. FIG. 15 shows an example of the signaling design. The parameter "measPorts" can indicate the subset of ports for the UE to measure the CSI-RS. The parameter "measPorts" can be configured as a bit map in which each bit with one indicates that the UE should measure the corresponding CSI-RS port. For the case of 32 ports, the bit map can contain 32 bits. Therefore, the BS can set any one or more ports as the subset of ports for the UE to measure the CSI-RS. The rest of ports can be precoded for other UEs. Therefore, on the same set of REs, CSI-RS can be multiplexed for more UEs.

Alternatively, as a second solution, a subset of the CDM groups for the UE to measure CSI-RS can be configured. According to the present disclosure, the RRC message provided from a BS to a UE can contain information on a subset of CDM groups for the UE to measure the CSI-RS. Such an information can include a bit map for the subset of CDM groups, wherein each bit with one indicates a corresponding CDM group on which the UE should measure the CSI-RS.

Currently, the BS can configure maximum 32-port CSI-RS. Depending on the Row in Table 1, it can contain up to 16 different CDM groups, wherein, each CDM group uses a set of resources with any of the patterns described above (for example, the patterns shown in FIG. 11). More particularly, each CDM group corresponds to some certain ports (e.g. at least two certain ports).

FIG. 16 shows an example of signaling design under the second solution. The parameter "measCDMgroups" can indicate the subset of CDM groups for the UE to measure the CSI-RS. The parameter "measCDMgroups" can be configured as a bit map in which each bit with one indicates that the UE should measure the corresponding CDM group. For the case of Table 1, the bit map can contain 16 bits. Therefore, the BS can set any one or more CDM group as the subset of CDM groups for the UE to measure the CSI-RS. In other words, the UE can measure the CSI-RS on those ports corresponding to the subset of CDM groups set by the BS. The rest ports corresponding to the rest CDM groups can be precoded for other UEs. Therefore, on the same set of REs, CSI-RS can be multiplexed for more UEs.

The above describes two solutions for selecting a portion of ports for UE to measure the CSI-RS. With the first solution, high level flexibility is given in terms of both the number of ports and the particular ports that constitute the subset, while, the overhead of the bitmap is slightly large, which consumes 32 bits. With the second solution, the overhead of the bitmap is relatively small, which consumes 16 bits, while the flexibility is not very high, because each CDM group actually corresponds to a fixed set of ports.

Note that, the subset of ports and the subset of CDM groups are all designed for the CSI-RS measurement purpose. For other purposes, for example, for the rate matching purpose, UE should still rate match all the configured CSI-RS ports/CDM groups rather than the subset of ports/CDM groups.

CSI-RS Port to Subband Mapping

According to the present disclosure, the UE can be configured to measure different CSI-RS ports on different subbands. For example, BS can provide a RRC message (e.g. CSI-ReportConfig) to the UE, wherein such a RRC message indicates at least two subbands on which the UE should measure the CSI-RS either on at least two sets of ports respectively, or on at least two sets of CDM groups respectively. The subband can be either CQI (Channel Quality Indication) subband, or, PMI (Precoding Matrix Indicator) subband. For example, in the case of two PMI subbands and total 16 CSI-RS ports, for the first PMI subband, the UE can measure CSI-RS port 3000 to 3007, and for the second PMI subband, the UE can measure CSI-RS port 3008 to 3015.

The resolution of the configuration of CSI-RS per subband can be either CSI-RS port level or CSI-RS CDM group level.

In addition, the present disclosure can also have any of the configurations below.

(1) A cellular base station, comprising:
    at least one antenna;
    at least one radio coupled to the at least one antenna; and a processor coupled to the at least one radio;
wherein the cellular base station is configured to:
provide a Radio Resource Control (RRC) message to a wireless device; and
provide a Channel State Information-Reference Signal (CSI-RS) to the wireless device via one or more ports based on the RRC message,
wherein, the RRC message at least indicates one or more of: information on a density of the CSI-RS, information on time domain locations of the CSI-RS, information on a subset of ports for the wireless device to measure the CSI-RS, and information on a subset of Code Division Multiplexing (CDM) groups for the wireless device to measure the CSI-RS.

(2) The cellular base station of (1), wherein
the information on a density of the CSI-RS includes a value of the density of the CSI-RS, and
in the case where the value of the density of the CSI-RS is lower than one, the information on a density of the CSI-RS further includes information indicating Physical Resource Blocks (PRBs) which carry the CSI-RS.

(3) The cellular base station of (2), wherein
the cellular base station is further configured to set the value of the density of the CSI-RS to a relatively low value such that the CSI-RS provided using a set of Resource Elements (REs) is enabled to be multiplexed for as many wireless devices as possible.

(4) The cellular base station of (2), wherein
the value of the density of the CSI-RS is lower than a value of the density of the CSI-RS specified in 3GPP TS 38.211 V16.4.0-Table 7.4.1.5.3-1; and/or
the value of the density of the CSI-RS is set to 0.5 for the case where the CSI-RS is provided via 4 ports, 8 ports or 12 ports, or the value of the density of the CSI-RS is set to 0.25 or 0.125 for the case where the CSI-RS is provided via any number of ports.

(5) The cellular base station of (2), wherein the cellular base station is further configured to:
receive capability information from the wireless device, wherein the capability information indicates a number of ports supported by the wireless device, and
set the value of the density of the CSI-RS based on the number of ports supported by the wireless device, wherein the value of the density of the CSI-RS is set to a relatively low value in responsive to the number of ports supported by the wireless device being smaller than a predetermined threshold.

(6) The cellular base station of (1), wherein
the information on time domain locations indicates locations of a first symbol of the CSI-RS in time domain, and
wherein, the information on time domain locations indicates at least three locations of a first symbol of the CSI-RS in time domain.

(7) The cellular base station of (1), wherein
the information on a subset of ports for the wireless device to measure the CSI-RS includes a bit map for the subset of ports, wherein each bit with one indicates a corresponding port on which the wireless device should measure the CSI-RS (8) The cellular base station of (1), wherein
the information on a subset of CDM groups for the wireless device to measure the CSI-RS includes a bit map for the subset of CDM groups, wherein each bit with one indicates a corresponding CDM group on which the wireless device should measure the CSI-RS.

(9) The cellular base station of (1), wherein
the RRC message further includes information on a CDM type for the CSI-RS,
wherein the CDM type indicates a pattern describing RE occupation by the CSI-RS in frequency and time domain, and
wherein the pattern allows the CSI-RS to occupy 4 subcarriers or 8 subcarriers in frequency domain and/or allows the CSI-RS to occupy 8 symbols in time domain.

(10) The cellular base station of (1), wherein the cellular base station is further configured to provide a second RRC message to the wireless device, and
wherein the second RRC message indicates at least two subbands on which the wireless device should measure the CSI-RS either on at least two sets of ports respectively, or on at least two sets of CDM groups respectively.

(11) A cellular base station, comprising:
at least one antenna;
at least one radio coupled to the at least one antenna; and
a processor coupled to the at least one radio;
wherein the cellular base station is configured to:
provide a first Radio Resource Control (RRC) message to a wireless device,
provide a second RRC message to the wireless device, and
provide a Channel State Information-Reference Signal (CSI-RS) to the wireless device via one or more ports based on the first RRC message,
wherein the second RRC message indicates at least two subbands on which the wireless device should measure the CSI-RS either on at least two sets of ports respectively, or on at least two sets of CDM groups respectively.

(12) A wireless device, comprising:
at least one antenna;
at least one radio coupled to the at least one antenna; and
a processor coupled to the at least one radio;
wherein the wireless device is configured to:
receive a Radio Resource Control (RRC) message from a cellular base station; and
receive a Channel State Information-Reference Signal (CSI-RS) from the cellular base station via one or more ports based on the RRC message,
wherein, the RRC message at least indicates one or more of: information on a density of the CSI-RS, information on time domain locations of the CSI-RS, information on a subset of ports for the wireless device to measure the CSI-RS, and information on a subset of Code Division Multiplexing (CDM) groups for the wireless device to measure the CSI-RS.

(13) The wireless device of (12), wherein
the information on a density of the CSI-RS includes a value of the density of the CSI-RS, and
in the case where the value of the density of the CSI-RS is lower than one, the information on a density of the CSI-RS further includes information indicating Physical Resource Blocks (PRBs) which carry the CSI-RS.

(14) The wireless device of (13), wherein
the value of the density of the CSI-RS is lower than a value of the density of the CSI-RS specified in 3GPP TS 38.211 V16.4.0-Table 7.4.1.5.3-1, and/or
the value of the density of the CSI-RS is set to 0.5 for the case where the CSI-RS is provided via 4 ports, 8 ports or 12 ports, or the value of the density of the CSI-RS is set to 0.25 or 0.125 for the case where the CSI-RS is provided via any number of ports.

(15) The wireless device of (13), wherein the wireless device is further configured to:
provide capability information to the cellular base station, wherein the capability information indicates a number of ports supported by the wireless device, and
wherein the value of the density of the CSI-RS is set to a relatively low value in the case where the number of ports supported by the wireless device is smaller than a predetermined threshold.

(16) The wireless device of (12), wherein
the information on time domain locations indicates locations of a first symbol of the CSI-RS in time domain, and
wherein, the information on time domain locations indicates at least three locations of a first symbol of the CSI-RS in time domain.

(17) The wireless device of (12), wherein
the information on a subset of ports for the wireless device to measure the CSI-RS includes a bit map for the subset of ports, wherein each bit with one indicates a corresponding port on which the wireless device should measure the CSI-RS.

(18) The wireless device of (12), wherein
the information on a subset of CDM groups for the wireless device to measure the CSI-RS includes a bit map for the subset of CDM groups, wherein each bit with one indicates a corresponding CDM group on which the wireless device should measure the CSI-RS.

(19) The wireless device of (12), wherein
the RRC message further includes information on a CDM type for the CSI-RS,
wherein the CDM type indicates a pattern describing RE occupation by the CSI-RS in frequency and time domain, and
wherein the pattern allows the CSI-RS to occupy 4 subcarriers or 8 subcarriers in frequency domain and/or allows the CSI-RS to occupy 8 symbols in time domain.

(20) The wireless device of (12), wherein the wireless device is further configured to receive a second RRC message from the cellular base station, and
wherein the second RRC message indicates at least two subbands on which the wireless device should measure the CSI-RS either on at least two sets of ports respectively, or on at least two sets of CDM groups respectively.

(21) A wireless device, comprising:
at least one antenna;
at least one radio coupled to the at least one antenna; and
a processor coupled to the at least one radio;
wherein the cellular base station is configured to:
receive a first Radio Resource Control (RRC) message from a cellular base station,
receive a second RRC message from the cellular base station, and
receive a Channel State Information-Reference Signal (CSI-RS) from the cellular base station via one or more ports based on the first RRC message,
wherein the second RRC message indicates at least two subbands on which the wireless device should measure the CSI-RS either on at least two sets of ports respectively, or on at least two sets of CDM groups respectively.

(22) A method for a cellular base station, comprising:
providing a Radio Resource Control (RRC) message to a wireless device; and
providing a Channel State Information-Reference Signal (CSI-RS) to the wireless device via one or more ports based on the RRC message,
wherein, the RRC message at least indicates one or more of: information on a density of the CSI-RS, information on time domain locations of the CSI-RS, information on a subset of ports for the wireless device to measure the CSI-RS, and information on a subset of Code Division Multiplexing (CDM) groups for the wireless device to measure the CSI-RS.

(23) A method for a cellular base station, comprising:
providing a first Radio Resource Control (RRC) message to a wireless device,
providing a second RRC message to the wireless device, and
providing a Channel State Information-Reference Signal (CSI-RS) to the wireless device via one or more ports based on the first RRC message,
wherein the second RRC message indicates at least two subbands on which the wireless device should measure the CSI-RS either on at least two sets of ports respectively, or on at least two sets of CDM groups respectively.

(24) A method for a wireless device, comprising:
receiving a Radio Resource Control (RRC) message from a cellular base station; and
receiving a Channel State Information-Reference Signal (CSI-RS) from the cellular base station via one or more ports based on the RRC message,
wherein, the RRC message at least indicates one or more of: information on a density of the CSI-RS, information on time domain locations of the CSI-RS, information on a subset of ports for the wireless device to measure the CSI-RS, and information on a subset of Code Division Multiplexing (CDM) groups for the wireless device to measure the CSI-RS.

(25) A method for a wireless device, comprising:
receiving a first Radio Resource Control (RRC) message from a cellular base station,
receiving a second RRC message from the cellular base station, and
receiving a Channel State Information-Reference Signal (CSI-RS) from the cellular base station via one or more ports based on the first RRC message,
wherein the second RRC message indicates at least two subbands on which the wireless device should measure the CSI-RS either on at least two sets of ports respectively, or on at least two sets of CDM groups respectively.

(26) An apparatus, comprising:
a processor configured to cause a wireless device to:
receive a Radio Resource Control (RRC) message from a cellular base station; and
receive a Channel State Information-Reference Signal (CSI-RS) from the cellular base station via one or more ports based on the RRC message, wherein, the RRC message at least indicates one or more of: information on a density of the CSI-RS, information on time domain locations of the CSI-RS, information on a subset of ports for the wireless device to measure the CSI-RS, and information on a subset of Code Division Multiplexing (CDM) groups for the wireless device to measure the CSI-RS.

(27) An apparatus, comprising:
a processor configured to cause a wireless device to:
receive a first Radio Resource Control (RRC) message from a cellular base station,
receive a second RRC message from the cellular base station, and receive a Channel State Information-Reference Signal (CSI-RS) from the cellular base station via one or more ports based on the first RRC message,
wherein the second RRC message indicates at least two subbands on which the wireless device should measure the CSI-RS either on at least two sets of ports respectively, or on at least two sets of CDM groups respectively.

(28) A computer-readable storage medium storing program instructions, wherein the program instructions, when executed by a computer system, cause the computer system to perform the method of (22) or (23).

(29) A computer-readable storage medium storing program instructions, wherein the program instructions, when executed by a computer system, cause the computer system to perform the method of (24) or (25).

(30) A computer program product, comprising program instructions which, when executed by a computer, cause the computer to perform the method of (22) or (23).

(31) A computer program product, comprising program instructions which, when executed by a computer, cause the computer to perform the method of (24) or (25).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE or BS) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A base station, comprising:
at least one antenna;
at least one radio coupled to the at least one antenna; and
a processor coupled to the at least one radio, wherein the processor is configured to:
transmit a Radio Resource Control (RRC) message to a wireless device;
wherein an uplink (UL) channel and a downlink (DL) channel are similar, multiplex a first Channel State Information-Reference Signal (CSI-RS) for the wireless device and a second CSI-RS for a second wireless device; and
transmit the first CSI-RS to the wireless device via one or more ports based on the RRC message, wherein resource elements (REs) occupied by the first CSI-RS and REs occupied by the second CSI-RS occupy same symbols in a time domain,
wherein the RRC message at least indicates information on a Code Division Multiplexing (CDM) type for the first CSI-RS, wherein the CDM type indicates an orthogonal cover code (OCC) pattern describing RE occupation by the first CSI-RS in a frequency domain and a time domain, wherein the OCC pattern allows the first CSI-RS to occupy 8 subcarriers in the frequency domain for the wireless device to measure the first CSI-RS, wherein the OCC pattern allows the first CSI-RS to occupy 8 symbols in the time domain, and
wherein the RRC message further comprises a value of a density of the first CSI-RS set to 0.125.

2. The base station of claim 1, wherein the information on the value of the density of the first CSI-RS further includes information indicating Physical Resource Blocks (PRBs) which carry the first CSI-RS.

3. The base station of claim 2, wherein the processor is further configured to:
receive capability information from the wireless device, wherein the capability information indicates a number of ports supported by the wireless device wherein the value of the density of the first CSI-RS is set based on the number of ports supported by the wireless device being more than X ports, wherein the value of the density of the first CSI-RS is set responsive to the number of ports supported by the wireless device being smaller than a predetermined threshold of Y ports.

4. The base station of claim 1, wherein the RRC message further comprises:
information on time domain locations comprising at least three locations of a first symbol of the first CSI-RS in the time domain.

5. The base station of claim 1, wherein the RRC message further comprises:

a bit map for a subset of ports, wherein a bit of the bit map indicates a corresponding port of the subset of ports for the wireless device to measure the first CSI-RS.

6. The base station of claim 1, wherein the RRC message further comprises a bit map for a subset of CDM groups, wherein a bit of the bit map indicates a corresponding CDM group of the subset of CDM groups for the wireless device to measure the first CSI-RS.

7. The base station of claim 1, wherein the processor is further configured to transmit a second RRC message to the wireless device, and
wherein the second RRC message indicates at least two subbands for the wireless device to measure the first CSI-RS either on at least two sets of ports respectively, or on at least two sets of CDM groups respectively.

8. A wireless device, comprising:
at least one antenna;
at least one radio coupled to the at least one antenna; and
a processor coupled to the at least one radio, wherein the processor is configured to:
receive a Radio Resource Control (RRC) message from a base station; and
receive a first Channel State Information-Reference Signal (CSI-RS) from the base station via one or more ports based on the RRC message,
wherein an uplink (UL) channel and a downlink (DL) channel are similar, the first CSI-RS for the wireless device is multiplexed with a second CSI-RS for a second wireless device, wherein resource elements (REs) occupied by the first CSI-RS and REs occupied by the second CSI-RS occupy same symbols in a time domain,
wherein, the RRC message at least indicates information on a Code Division Multiplexing (CDM) type for the first CSI-RS, wherein the CDM type indicates an orthogonal cover code (OCC) pattern describing RE occupation by the first CSI-RS in a frequency domain and a time domain, wherein the OCC pattern allows the first CSI-RS to 8 subcarriers in the frequency domain for the wireless device to measure the first CSI-RS, wherein the OCC pattern allows the first CSI-RS to occupy 8 symbols in the time domain, and
wherein the RRC message further comprises a value of a density of the first CSI-RS set to 0.125.

9. The wireless device of claim 8, wherein the information on the value of the density of the first CSI-RS further includes information indicating Physical Resource Blocks (PRBs) which carry the first CSI-RS.

10. The wireless device of claim 9, wherein the processor is further configured to:
transmit capability information to the base station, wherein the capability information indicates a number of ports supported by the wireless device, and
wherein the value of the density of the first CSI-RS is set responsive to the number of ports supported by the wireless device being smaller than a predetermined threshold of Y ports.

11. The wireless device of claim 8, wherein the RRC message further comprises:
information on time domain locations comprising at least three locations of a first symbol of the first CSI-RS in the time domain.

12. The wireless device of claim 8, wherein the RRC message further comprises:
a bit map for a subset of ports, wherein a bit of the bit map indicates a corresponding port of the subset of ports for the wireless device to measure the first CSI-RS.

13. The wireless device of claim 8, wherein the RRC message further comprises a bit map for a subset of CDM groups, wherein a bit of the bit map indicates a corresponding CDM group of the subset of CDM groups for the wireless device to measure the first CSI-RS.

14. The wireless device of claim 8, wherein the wireless device is further configured to receive a second RRC message from the base station, and
wherein the second RRC message indicates at least two subbands for the wireless device to measure the first CSI-RS either on at least two sets of ports respectively, or on at least two sets of CDM groups respectively.

15. A method for a base station, comprising:
transmitting a Radio Resource Control (RRC) message to a wireless device;
wherein an uplink (UL) channel and a downlink (DL) channel are similar, multiplex a first Channel State Information-Reference Signal (CSI-RS) for the wireless device and a second CSI-RS for a second wireless device;
transmitting the first CSI-RS to the wireless device via one or more ports based on the RRC message, wherein resource elements (REs) occupied by the first CSI-RS and REs occupied by the second CSI-RS occupy same symbols in a time domain,
wherein the RRC message at least indicates information on a Code Division Multiplexing (CDM) type for the first CSI-RS, wherein the CDM type indicates an orthogonal cover code (OCC) pattern describing RE occupation by the first CSI-RS in a frequency domain and a time domain, wherein the OCC pattern allows the first CSI-RS to occupy 8 subcarriers in the frequency domain for the wireless device to measure the first CSI-RS, wherein the OCC pattern allows the first CSI-RS to occupy 8 symbols in the time domain, and
wherein the RRC message further comprises a value of a density of the first CSI-RS set to 0.125.

16. The base station of claim 3, wherein X=2 and Y=4.

17. The base station of claim 1, wherein the first CSI-RS is transmitted via more than 32 ports.

* * * * *